UNITED STATES PATENT OFFICE.

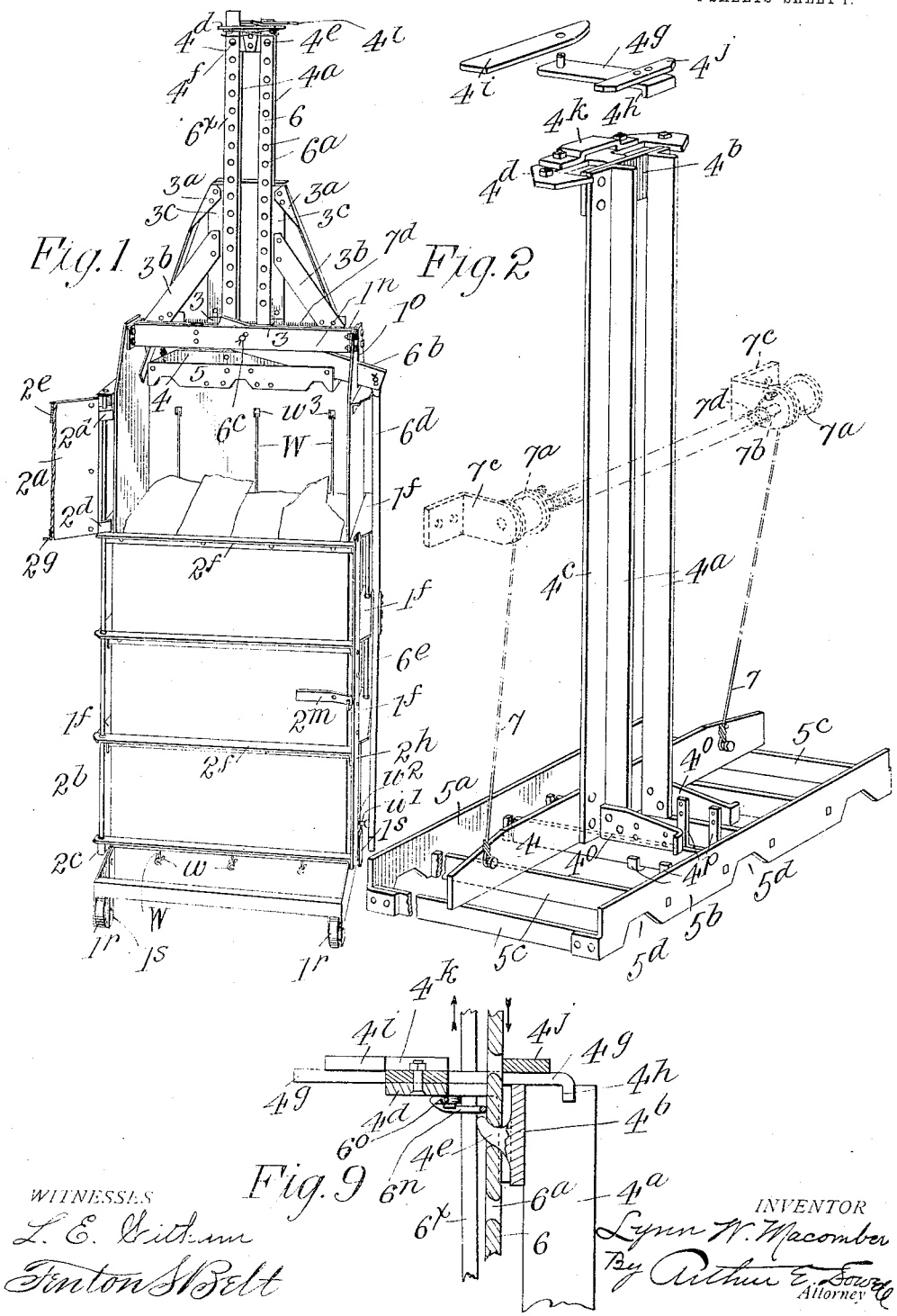

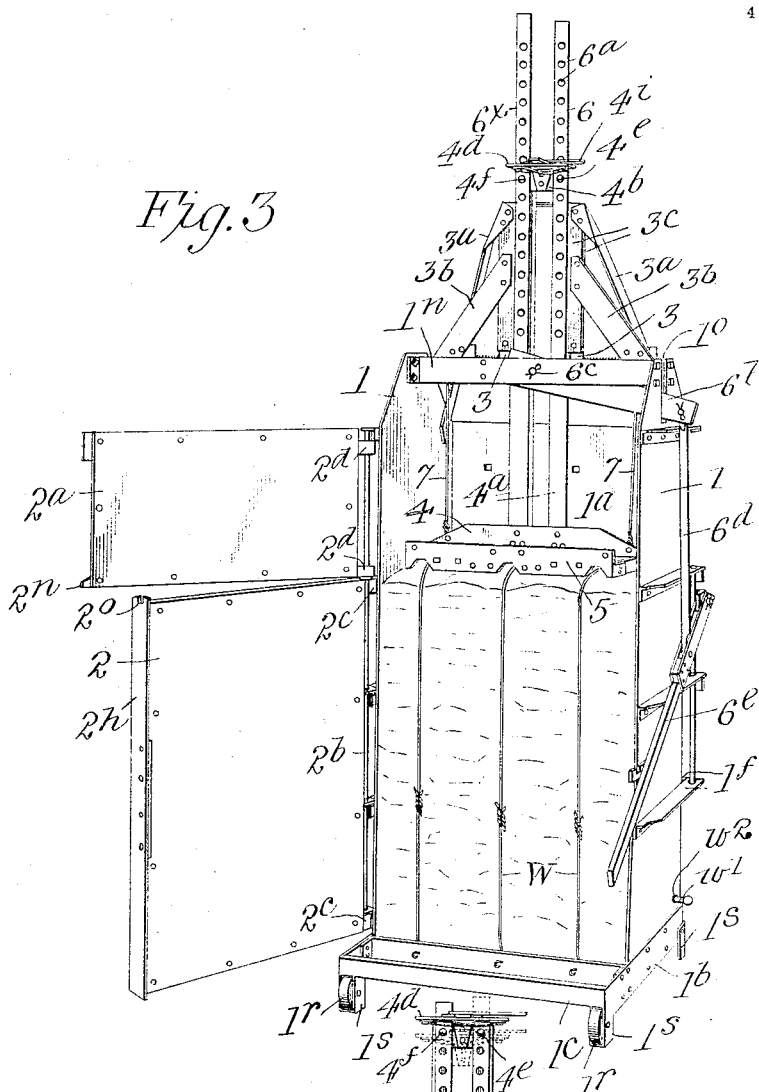

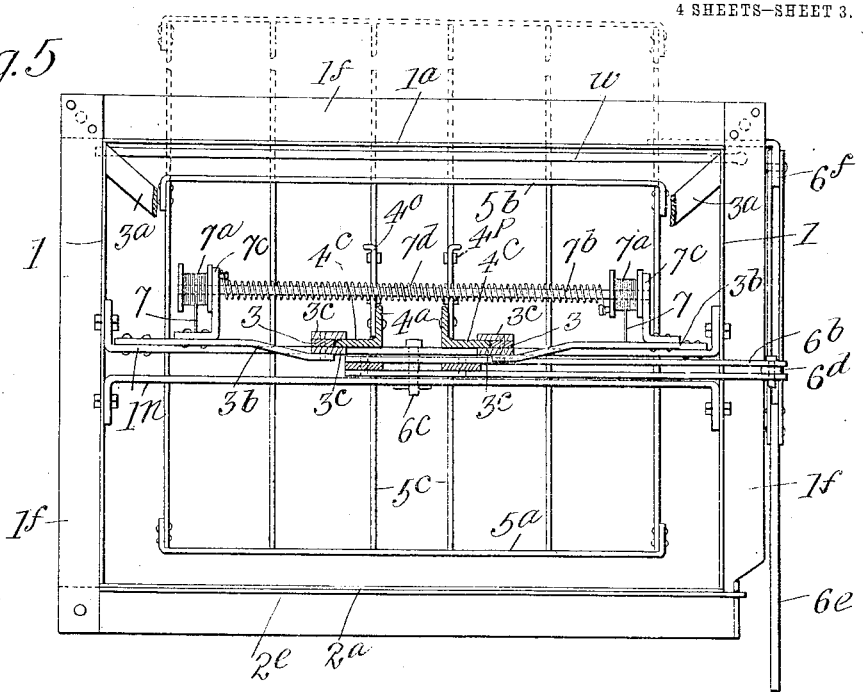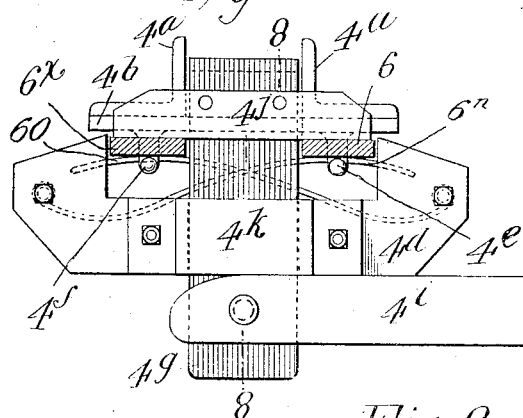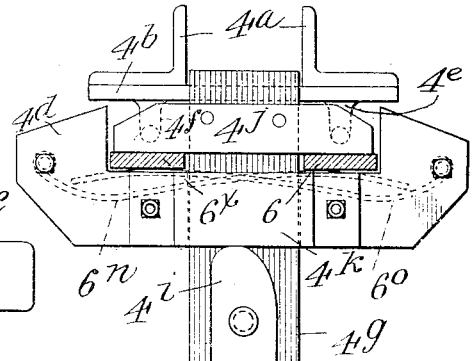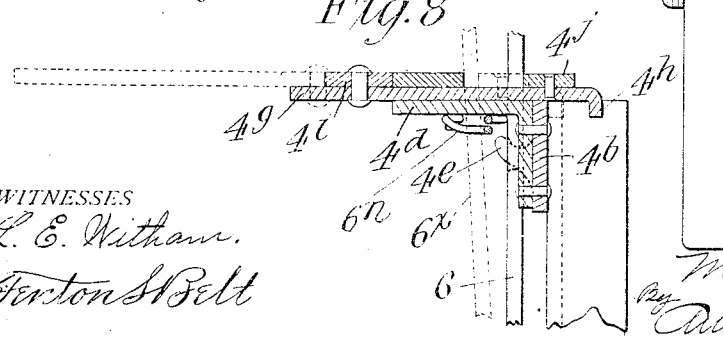

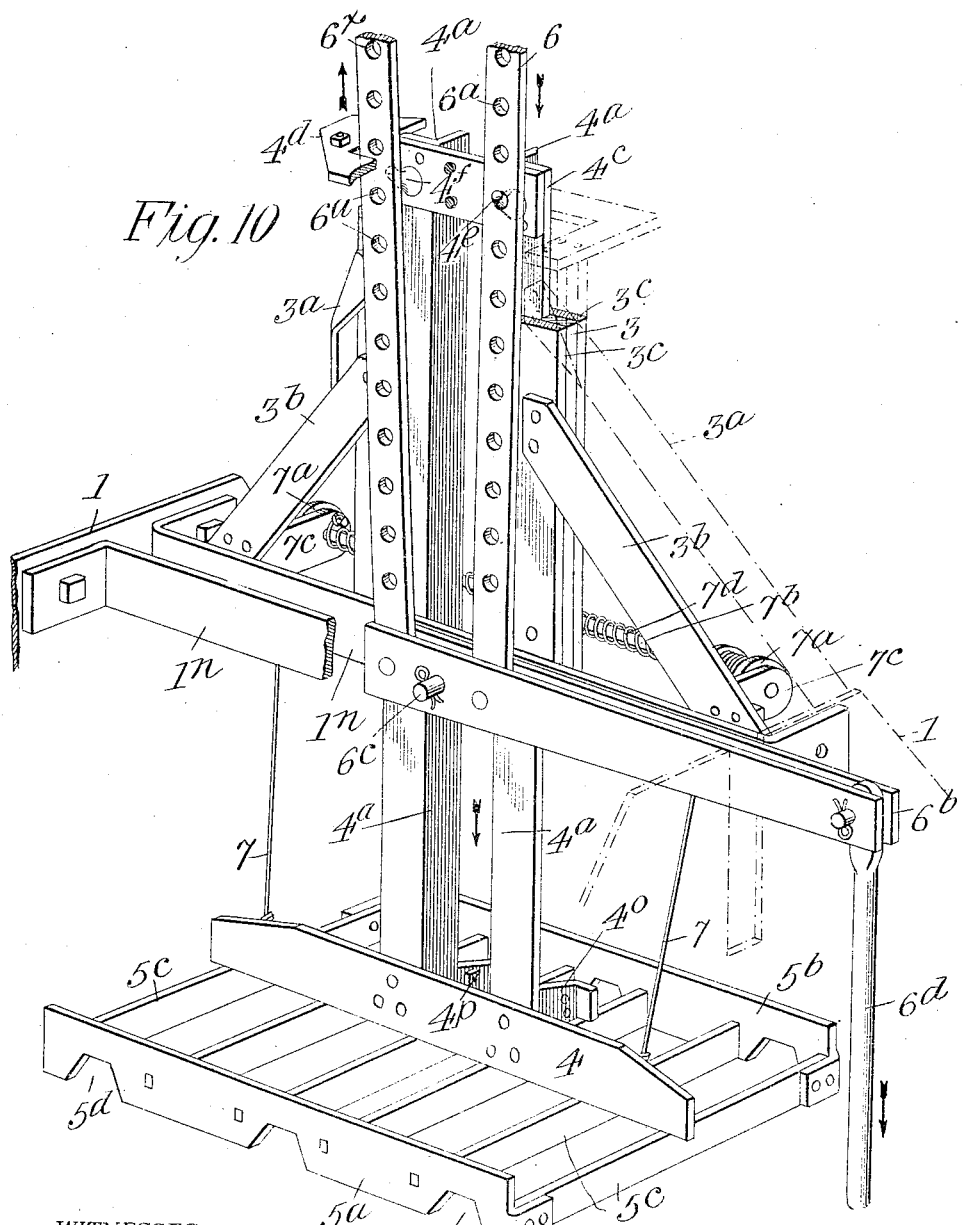

LYNN W. MACOMBER, OF BATTLE CREEK, MICHIGAN, ASSIGNOR TO ALSTEEL MANUFACTURING COMPANY, OF BATTLE CREEK, MICHIGAN, A CORPORATION OF MICHIGAN.

BALING-PRESS.

1,125,362.　　　　Specification of Letters Patent.　　Patented Jan. 19, 1915.

Application filed March 21, 1913.　Serial No. 755,995.

*To all whom it may concern:*

Be it known that I, LYNN W. MACOMBER, of Battle Creek, in the county of Calhoun and State of Michigan, have invented certain new and useful Improvements in Baling-Presses; and I hereby declare that the following is a full, clear, and exact description thereof, reference being had to the accompanying drawings, which form part of this specification.

This invention is a novel baler, or machine for compressing light, bulky materials such as rags and waste paper into bales.

The invention particularly resides in the novel means for operating the presser-head to compress the material; novel means for releasing the presser-head at the end of a compressing operation; and novel means for raising the presser-head.

It also further provides novel features of construction and arrangement of parts of the baler which will be hereinafter clearly described with reference to the machine shown in the accompanying drawings, which illustrate a baler embodying a practical, and the at present preferred, form of the invention.

In said drawings:—Figure 1 is a perspective view of the baler with the follower or presser-head, raised, and the upper door open, ready for filling. Fig. 2 is an enlarged perspective view of the presser-head, some of the parts connected therewith being shown detached. Fig. 3 is a perspective view of the baler opened, showing a compressed bale therein. Fig. 4 is a detail view of the presser-head and its operating devices detached. Fig. 5 is an enlarged top plan view of the baler, partly in section. Figs. 6 and 7 are enlarged top plan views of the presser-head operating devices. Fig. 8 is a vertical section on line 8—8, Fig. 6. Fig. 9 is a similar section in the line of one of the lugs. Fig. 10 is a perspective view of the presser-head and its operating devices detached.

The baler comprises a body or baling chamber consisting of opposite side walls 1, and a rear wall $1^a$, mounted upon a base frame $1^b$, which base preferably projects beyond the front side of the baler as shown at $1^c$. The sides and rear of the baler may be braced by flanged metal bars $1^f$ as shown.

The baling chamber is open at top, and its front wall is formed by a large lower door 2, and a small upper door $2^a$. These doors may be hinged to the front of one of the side walls 1 in any suitable manner. As shown they are hinged by means of a vertical rod $2^b$ which engages perforated lugs $2^c$ on the door 2 and similar lugs $2^d$ on the door $2^a$, and also extends through openings in the forward ends of the braces $1^f$ attached to the adjacent side wall 1 of the chamber. The door 2 may be stiffened by transverse braces $2^f$ and the door $2^a$ by a top piece $2^e$ and bottom flange $2^g$. The door 2 preferably has a vertical flange or plate $2^h$ on its front edge which is adapted to lap over the front edge of the adjacent side wall 1 when the door is closed so as to prevent lateral spreading of the walls of the chamber when a bale is being compressed. The door 2 may be fastened in closed position by means of a latch $2^m$ of any suitable kind. The upper door $2^a$ may be secured, when closed, by a similar latch, or as shown it may have a lug $2^a$ on its front edge engaging a notch $2^o$ in the upper end of the flange $2^h$ as shown. The invention however is not restricted to any particular construction of the baling chamber, but I preferably make the walls and doors of the baling chamber out of sheet steel, and stiffen them where necessary with angle and strap irons.

By making the parts as shown of metal I produce a very strong serviceable baling machine, that is easily handled and moved, and which occupies little space.

The upper ends of the side walls 1 of the chamber extend above the top edges of the door $2^a$ and back wall $1^a$, and are rigidly connected by transverse parallel bars $1^n$. Attached to one of the bars $1^n$ are upright bars 3 which extend above the bar $1^n$ and are rigidly braced and secured in position by inclined braces $3^a$, $3^b$, the lower ends of braces $3^a$ are fastened to the side walls 1, and the lower ends of braces $3^b$ are fastened to the bars $1^n$ as indicated in the drawings. The bars 3 serve to guide the presser-head actuating bars $4^a$ in their vertical movements. These presser bars $4^a$ are preferably formed of angle iron and are connected at their lower ends to a transversely disposed horizontal metal plate 4, and their upper ends are connected by a member or casting $4^b$. The presser-head 5 is movably attached to the presser-bars beneath plate 4 as hereinafter described.

The side flanges of the presser-bars $4^a$ lie against the faces of the bars 3 and are confined in guideways formed by plates $3^e$ attached to the opposite sides of plates 3 but spaced apart thereby, see Fig. 5, slightly more than the thickness of the flanges of presser-bars $4^a$ as shown. The member or casting $4^b$ attached to the upper end of presser-bars $4^a$ is provided with outwardly and upwardly curved lugs or horns $4^e$, $4^f$, which are adapted to be engaged respectively by pull bars 6, $6^x$; said pull bars being preferably flat metal bars each provided with a longitudinal series of perforations $6^a$, any one of which is adapted to engage the adjacent lug $4^e$, $4^f$. The bars 6, $6^x$ are pivotally connected at their lower ends to a lever $6^b$, which lies between the bars $1^n$ and is pivoted on a bolt $6^c$ transfixing said bars $1^n$ and the lever. Preferably I form the lever $6^b$ of two parallel similar bars between which the lower ends of the bars 6, $6^x$ are pivoted as shown in Fig. 1, the pivotal connections of the bars 6, $6^x$ to the lever $6^n$ being at points equi-distant from the pivot $6^c$ of said lever. The long arm of said lever $6^b$ may extend through a slot $1^o$ in the upper end of one of the side members 1, as shown, and is pivotally connected to the upper end of a rod $6^d$ the lower end of which is in turn pivotally connected to a lever $6^e$ that is pivoted at one end to the frame, at as $6^f$. Said lever $6^e$ can be manually operated. The bars 6, $6^x$ stand parallel with the presser-bars $4^a$ but are separated therefrom by the member $4^b$ and one of the bars as shown.

When the lever $6^b$ is oscillated the bars 6, $6^x$ will be moved oppositely, and alternately raised and lowered. As the pull bar 6, (or $6^x$) is raised, it will ride over the lug $4^e$ (or $4^f$), but when said bar is lowered it will engage its corresponding lug $4^e$ (or $4^f$) and pull down the member $4^b$ and the parts connected therewith, thus depressing the presser-head 5. (See Figs. 8 and 9).

It will be seen that when pull bar 6, or $6^x$, rises, it will ride off and over the lug $4^e$, (or $4^f$), but will engage same on its descent. In order to insure the engagement of the bar 6 or $6^x$ with the related lug $4^e$, or $4^f$, when it is desired to operate the presser-head, and to disengage same therefrom when it is desired to elevate the presser-head rapidly; I attach to the member $4^b$ a plate $4^d$, which plate is slit or notched to accommodate the bars 6, $6^x$, see Figs. 6 and 7, and to guide the latter in their vertical movements. To the underside of this plate $4^d$ are attached springs $6^n$, $6^o$, which are shown as flat springs, but may be of other construction, and are respectively adapted to engage pull bars 6, $6^x$ and hold the latter yielding in engagement with the lugs $4^e$, $4^f$, and press said bars yieldingly toward member $4^b$. It will be seen that the said springs will allow pull bars 6, $6^x$, to ride off and over the lugs $4^e$, $4^f$ in the upward movements of said bars, and on the downward movements thereof will press them inward and cause them to engage the lugs $4^e$ or $4^f$ and thus apply positive downward movement to the presser-bars $4^a$ and there through to the presser-head. Thus when lever $6^b$ is operated the bars 6, $6^x$, are alternately raised and lowered, and the bar that descends (say 6) engages with its related lug on the member $4^b$ and forcibly depresses the latter, thereby depressing bars $4^a$ and the presser-head connected therewith; while the other bar (say $6^x$) rises and rides over the lug on said member. With this construction I obtain a double acting presser mechanism, and the presser plate is continually depressed, on both the up and down strokes of the lever $6^c$, by the alternate action of the bars 6, $6^x$. The slots in the plate $4^d$ are sufficiently deep to allow the bars 6, $6^x$ to automatically engage and disengage the lugs on the member $4^b$ as described.

When it is desired to raise the presser-head the bars 6, $6^x$ should be both disengaged, and held disengaged, from the lugs $4^e$, $4^f$; for this purpose a slide $4^g$ is mounted on the plate $4^d$ and adapted to move transversely of this plate between the bars $4^a$ and the bars 6, $6^x$; said slide may be conveniently guided in a loop $4^k$ attached to the plate $4^d$. The slide $4^g$ has its rear end turned down as at $4^h$ to limit its forward movement by contact with the member $4^b$, see Fig. 7. A cam lever $4^i$ is pivoted to the forward end of this slide $4^g$. To the rear end of the slide is attached a cross piece $4^j$ the ends of which extend behind the respective bars 6, $6^x$, see Figs. 6 and 7.

When the cam lever $4^i$ is turned into the position shown in Fig. 6 the slide is retracted and the springs $6^n$, $6^o$ will yieldingly hold the bars 6, $6^x$ in engagement with the lugs $4^e$, $4^f$. If the cam lever be turned to the position shown in Fig. 7 the slide $4^g$ will be drawn forward and the plate $4^j$ will engage the bars 6, $6^x$ and move them away from and out of engagement with the lugs $4^e$, $4^f$, see Fig. 7, and hold them in this position against the action of the springs $6^n$, $6^o$; this will permit the presser-bars $4^a$ to be raised or lowered independently of the bars 6, $6^x$ and their operating devices.

The follower or presser-head 5 is preferably formed of metal, and comprises front and rear plates $5^a$, $5^b$ connected by a series of parallel transverse bars $5^c$. The front and rear plates may be notched on their under sides as at 5ᵈ for a purpose hereinafter explained. This presser-head is connected with or suspended from the lower ends of presser-bars 4ᵃ, see Fig. 2; and preferably I connect this presser-head slidably to said bars so that it can be slid backward or forward relatively to plate 4. For this purpose I attach angle plates 4° to the lower end of the presser-bars 4ᵃ, adjacent the plate 4, and to these angle plates are attached depending strap irons 4ᵖ, the lower ends of which are upturned to engage and support the adjacent bars 5ᶜ of the presser-head, see Fig. 2, and thus suspend the presser-head from the bars 4ᵃ, while permitting a horizontal sliding movement of the presser-head relative to plate 4. This construction enables the presser-head, when in elevated position, to be pushed backward out of the way, as shown in Fig. 1, the presser-head then projecting partially out of the chamber through the opening above the top of the rear wall thereof as indicated in dotted lines in Fig. 5, thus permitting the baling chamber to be completely filled with material before the compressing operation.

As shown in Fig. 1 the waste paper or other material to be baled can be thrown into the baling chamber after the lower door 2 is closed, and when filled to the height of the door 2, the upper door 2ᵃ can be closed and the material thrown over the door into the chamber until the latter is completely filled; then the presser-head can be drawn forward, by hand, into operative position; and then be forcibly lowered by operating lever 6ᵇ as described.

When the bars 6, 6ˣ are disengaged from the lugs, as shown in Fig. 7, the presser-head may be automatically raised, or its lifting be facilitated, by means of cables 7, which are attached to the ends of the plate 4, and wound upon drums 7ᵃ on a shaft 7ᵇ journaled in brackets 7ᶜ attached to one of the bars 1ⁿ, or other fixed part.

The shaft 7ᵇ may be provided with suitable springs which will be tensioned when the presser-head descends and will, when the presser-head is released, rotate the shaft to wind the cables and elevate the presser-head. As shown, a helical spring 7ᵈ is strung on the shaft 7ᵇ, one end of said spring being attached to the shaft and the other end to one of the brackets 7ᶜ, or other fixed point, so that the spring will be tensioned when the presser-head descends, and will cause the shaft to rotate and raise the presser-head when it is released, and will hold the presser-head in elevated position, as shown in Fig. 1.

The machine is preferably mounted upon short legs 1ˢ at the corners of the base; and to the front legs are attached rollers or casters 1ʳ in such manner that when it is desired to move the machine by simply tilting it forward its weight will be transferred from the legs to the rollers 1ʳ and it can then be easily moved to any position desired; when restored to upright position the weight of the machine is supported on the legs 1ˢ, and the rollers 1ʳ are raised slightly off the floor and relieved of strain.

The operation may be briefly summarized as follows: After the machine is moved to the desired point the bars 6, 6ˣ, are disengaged from the lugs 4ᵉ, 4ᶠ by moving the cam-lever 4ⁱ into the position shown in Fig. 7, whereupon the presser-head 5 is raised by the action of the spring-controlled shaft 7ᵇ to the position shown in Fig. 1. Then the presser-head is slid backward so as to partly project out of the chamber and over the rear wall thereof, (as indicated in dotted lines Fig. 5). Then the door 2 is closed and the material to be compressed is thrown into the chamber until it reaches the top of the door 2; then the door 2ᵃ may be closed (or both doors could be closed) and the chamber completely filled with the material to be compressed. Then the presser-head is drawn forward and centrally positioned beneath the plate 4; then lever 4ⁱ is turned to the position shown in Fig. 6 allowing bars 6, 6ˣ to engage the lugs 4ᵉ, 4ᶠ. Then lever 6ᵇ is oscillated to cause the forcible descent of the presser-head by the alternate pull of bars 6, 6ˣ, and the material is compressed to any desired extent. When the material is sufficiently compressed the doors 2, 2ᵃ may be opened and the bale tied in any desired manner and removed.

The notches 5ᵈ in the plates 5ᵇ enable ties to be placed around the bale while the presser-head is holding the bale compressed. The method of tying the bale does not form part of the present invention, but a convenient mode of tying the bale is as follows: Before closing door 2, the loop ends of ties W are engaged with hooks or lugs w on the front side of the machine base, and then led in and to the rear of the baling chamber and passed under a rod $w^1$ which may be removably inserted and retained in holes $w^2$ in the end walls 1, adjacent the rear bottom corners of the baling chamber; from thence the ties are carried up alongside the back wall of the chamber and out through openings $w^3$ near the top of the back wall, to prevent the ties slipping or dropping out of place while the bale is being compressed. At the commencement of the baling operation, or after the presser-head has partially descended, the door 2ᵃ may be opened and the ties slipped through the notches 5ᵇ between the presser-head and bale, and allowed to hang over the top of the door 2, or on top of the presser-head. When the bale is compressed the door 2 is opened and the ends of the ties united, thus securely tying the bale. Then the presser-head is released and allowed to rise, and the bale is removed. These operations can be repeated indefinitely. The ties may be arranged or manipulated in any other desired manner so as to bind the compressed bale before it is discharged from the machine.

What I claim is:

1. In a baler, the combination of a baling chamber, a presser-head therein, presser bars connected with said presser-head, a member connected with said presser bars above the presser head, an oscillating lever above the presser head, and pull bars connected with said lever at opposite sides of its pivot and adapted to alternately engage said member and depress the presser bars and presser head when the lever is oscillated.

2. In a baler, the combination of a baling chamber, a presser-head therein, a presser bar connected therewith, a member connected with said presser bar provided with a pair of lugs, a pair of pull bars each adapted to engage one of the lugs on said member, and a lever for reciprocating said bars simultaneously in opposite directions.

3. In combination, a baling chamber, a presser-head therein, a presser bar connected therewith and extending out of the chamber, a member connected with said presser bar provided with a pair of lugs, a pair of pull bars each adapted to engage one of the lugs on said member, a lever for reciprocating said pull bars simultaneously in opposite directions, and means for normally holding the pull bars in yielding engagement with the lugs on said member.

4. In combination, a baling chamber, a presser-head therein, a presser bar connected therewith, a member on the presser bar provided with a pair of projecting lugs, a pair of perforated bars each adapted to engage one of the lugs on the member, an oscillating lever connected with said perforated bars for reciprocating them simultaneously in opposite directions, and means for yieldingly pressing the perforated bars toward said member.

5. In combination, a baling chamber, a presser-head therein, a presser bar connected therewith and extending out of the chamber, a member on the presser bar provided with a pair of outwardly projecting lugs, a pair of perforated pull bars each adapted to engage one of the lugs of the lever, an oscillating lever connected with said pull bars for reciprocating them simultaneously in opposite directions, and means for yieldingly pressing the pull bars toward said member so as to cause the descending pull bars to engage with a lug thereon, substantially as described.

6. In a baler, the combination of a baling chamber, a presser-head therein, a bar connected with said presser-head, a member connected with said presser bar, an oscillating lever, pull bars connected with said lever at opposite sides of its pivot and adapted to alternately engage and depress said member when the lever is oscillated; springs for holding the pull bars yieldingly in engagement with the member, and means for moving the pull bars away from said member to hold same out of engagement therewith.

7. In combination, a baling chamber, a presser-head therein, bars connected with said presser head and extending out of the chamber; a member connected with said presser bars, and provided with projecting lugs, an oscillating lever, pull bars connected with said lever at opposite sides of its pivot and adapted to alternately engage the lugs and depress said member when the lever is oscillated; springs for holding the pull bars yieldingly in engagement with the lugs on the member, and means for moving the bars laterally away from said member to hold same out of engagement with the lugs to permit the presser plate to rise.

8. In a baler, the combination of a baling chamber, a presser-head therein, a presser bar connected therewith, a member connected with said presser bar provided with a pair of lugs, a pair of pull bars each adapted to engage one of the lugs on said member, a lever for reciprocating said pull bars simultaneously in opposite directions; means for normally holding the pull bars in yielding engagement with the lugs on the member, and means for moving the pull bars away from said member and holding same out of engagement with the lugs to permit the presser-plate to rise.

9. In a baler, the combination of a baling chamber, a presser-head therein, a presser bar connected therewith and extending out of the chamber, a member connected with said presser bar provided with a pair of lugs, a pair of perforated pull bars each adapted to engage one of the lugs on said member, a lever for reciprocating said bars simultaneously in opposite directions; springs for holding the pull bars yieldingly in engagement with the lugs on the member, and means for moving the bars laterally away from said member and holding same out of engagement with the lugs to permit the presser-plate to rise.

10. In combination, a baling chamber, a presser-head therein, a presser bar connected therewith, a member on the presser bar provided with a pair of outwardly projecting lugs, a pair of perforated pull bars respectively adapted to engage one of the lugs of the lever, an oscillating lever connected with said pull bars for reciprocating them simultaneously in opposite directions, and means for yieldingly pressing the bars toward said member so as to cause the descending bar to engage with a lug thereon; with a slide adjacent said bars, and means for operating said slide so as to pull the bars away from said member and out of engagement with the lugs to permit the presser-plate to rise.

11. In combination, a chamber, a presser-head therein, a pair of parallel presser bars connected therewith, means for guiding said bars, a member attached to the upper end of said bars provided with a pair of lugs, a pair of pull bars beside the said presser bars, each pull bar having perforations adapted to engage the adjacent lug on the said member, an oscillating lever for actuating said pull bars simultaneously in opposite directions, and means for yieldingly pressing the pull bars toward said member to cause their engagement with the lugs when they descend and permit them to ride over the lugs when they ascend.

12. In combination, a baling chamber, a presser-head therein, a pair of presser bars connected therewith and extending out of the chamber, means for guiding said bars, a member attached to the presser bars provided with a pair of outwardly projecting lugs; a pair of perforated pull bars each adapted to engage one of the lugs of the lever, an oscillating lever connected with said pull bars for reciprocating them simultaneously in opposite directions; springs for yieldingly pressing the pull bars toward said member so as to cause the descending pull bar to engage with a lug thereon, a slide adjacent said bars, and means for operating said slide so as to move the pull bars away from said member and out of engagement with the lugs to permit the presser-plate to rise.

13. In combination, a baling chamber, a presser-head therein, a presser bar connected therewith, means for guiding said bar, a member attached to the said bar provided with a pair of lugs, a pair of pull bars beside the presser bar each pull bar having perforations adapted to engage the adjacent lug on the said member, an oscillating lever for actuating said pull bars simultaneously in opposite directions; with means attached to said member to guide said pull bars, springs for yieldingly pressing the pull bars toward said member, and means for disengaging the pull bars from said lugs and holding them out of engagement therewith to permit the presser-head to rise.

14. In combination, a chamber, a presser-head therein, a pair of parallel presser bars connected therewith, means for guiding said bars, a member attached to the upper end of said bars provided with a pair of curved lugs, a pair of pull bars beside the said presser bars, each pull bar having perforations adapted to engage the adjacent lug on the said member, an oscillating lever for actuating said pull bars simultaneously in opposite directions; with a slotted plate attached to said member to guide said bars, springs attached to said plate for yieldingly pressing the pull bars toward the said member, a slide on said plate, and means connected therewith for disengaging the pull bars from said lugs and holding them out of engagement therewith to permit the presser-head to rise.

15. A baling chamber comprising front, side and rear walls and base, a pair of doors for closing the front of the chamber, the lower door having a notch at its upper edge adapted to be engaged by the lower edge of the upper door when closed, substantially as described.

16. A baling chamber comprising front, side and rear walls and base, a pair of doors for closing the front of the chamber; a presser-head in said chamber, a presser bar connected therewith and extending out of the chamber, a member on the presser bar provided with a pair of lugs, a pair of perforated pull bars respectively adapted to engage one of the lugs of the lever, an oscillating lever connected with said pull bars for reciprocating them simultaneously in opposite directions, and means for yieldingly pressing the bars toward said member so as to cause the descending bar to engage with the lug thereon.

In testimony that I claim the foregoing as my own, I affix my signature in presence of two witnesses.

LYNN W. MACOMBER.

Witnesses:
A. W. DAVIS,
L. E. BAXTER.